(12) United States Patent
Liu et al.

(10) Patent No.: US 10,821,656 B2
(45) Date of Patent: Nov. 3, 2020

(54) PIPE END PROCESSING DEVICE

(71) Applicant: SANOH INDUSTRIAL CO., LTD., Shibuya-ku, Tokyo (JP)

(72) Inventors: Jining Liu, Koga (JP); Kazuhiko Nakazato, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/609,781

(22) PCT Filed: Apr. 23, 2018

(86) PCT No.: PCT/JP2018/016501
§ 371 (c)(1),
(2) Date: Oct. 31, 2019

(87) PCT Pub. No.: WO2019/021554
PCT Pub. Date: Jan. 31, 2019

(65) Prior Publication Data
US 2020/0061902 A1  Feb. 27, 2020

(30) Foreign Application Priority Data
Jul. 28, 2017  (JP) .................................. 2017-146654

(51) Int. Cl.
*B29C 57/00* (2006.01)
*B29C 57/02* (2006.01)
*B29C 57/06* (2006.01)
*B29L 23/00* (2006.01)

(52) U.S. Cl.
CPC ...... *B29C 57/06* (2013.01); *B29K 2995/0046* (2013.01); *B29L 2023/22* (2013.01)

(58) Field of Classification Search
CPC ......... B29C 57/00; B29C 57/02; B29C 57/04; B29C 57/06
See application file for complete search history.

(56) References Cited

U.S. PATENT DOCUMENTS

| 3,652,758 | A | * | 3/1972 | De Saint Piere ...... H01R 24/40 264/249 |
| 4,113,813 | A | * | 9/1978 | Wilson .................... B29C 57/04 425/393 |
| 4,150,087 | A | * | 4/1979 | de Putter ................ B29C 57/02 425/393 |
| 4,386,045 | A | * | 5/1983 | Vaisanen ............... B29C 57/025 425/393 |

(Continued)

*Primary Examiner* — Joseph S Del Sole
*Assistant Examiner* — Thu Khanh T Nguyen
(74) *Attorney, Agent, or Firm* — Posz Law Group, PLC

(57) ABSTRACT

A pipe end processing device includes a female die and a male die. The female die has a through hole with one side thereof being radially increased, the through hole having the molding surface for forming the protrusion formed on an inner circumference on the one side of the through hole. The male die includes a metal core passed through the through hole of the female die and configured to be axially moved, and a tubular elastic body fitted on one end part of the metal core and protruding from the one side of the female die. The tubular elastic body is configured to be axially compressed by a movement of the metal core to radially expand by deformation thereby to press the surface to be processed of the pipe against the molding surface of the female die.

16 Claims, 7 Drawing Sheets

(56) References Cited

U.S. PATENT DOCUMENTS 5,928,451 A * 7/1999 Johansson ............... B29C 57/02
                                                                                                  425/393
2013/0264820 A1* 10/2013 Munoz De Juan ... B29C 57/025
                                                                                                  425/112

* cited by examiner

PIPE END PROCESSING DEVICE

CROSS REFERENCE TO RELATED APPLICATIONS

This application is a U.S. national stage of International Patent Application No. PCT/JP2018/016501 filed on Apr. 23, 2018 and is based on Japanese Patent Application No. 2017-146654 filed on Jul. 28, 2017, the disclosures of which are incorporated herein by reference.

TECHNICAL FIELD

The present invention relates to a pipe end processing device, and more particularly to a pipe end processing device that allows a protrusion such as a flare, bulge, spool and the like to be formed to an end part of a pipe, while also being capable of clamping the end part of the pipe.

BACKGROUND ART

It is a conventional practice to form protrusions that are called flare, bulge, or spool on end parts of steel or synthetic resin pipes used in various types of tubing such as automotive tubing, for connection with rubber hoses or the like, or with a connection component called "quick connector", in a process of setting up a tubing system. When applied to connection with a rubber hose or the like, the protrusion can ensure and maintain an airtight seal in the connected parts, as well as serves to prevent unwanted disconnection of the hose or the like from the pipe by increasing the friction resistance.

Hydroforming has been known before as a method of forming protrusions on pipes. In this forming method, the pipe set in the mold is filled with a pressurized liquid while being compressed from both ends by pistons advanced from left and right so as to transform the pipe to conform to the recess formed in the mold (see, for example, PTL 1).

CITATION LIST

Patent Literature

[PTL 1] Japanese Patent Application Laid-open No. 2002-239645

SUMMARY OF INVENTION

Technical Problem

The problem with the conventional hydroforming method for forming protrusions described above was that it required a sturdy sealing structure for hermetically containing the high-pressure oil, and since the pipe was axially compressed by applying forces from both ends, the equipment tended to have a complex and bulky structure and the facility cost was high. Another problem was that it was hard to form a protrusion close to an end of the pipe, or to form a protrusion on a pipe that has already been bent, because of the need to clamp both ends of the pipe.

The present invention was made in view of the problems encountered by the background art described above. An object of the present invention is to provide a pipe end processing device that allows a protrusion to be formed on a pipe by applying a force only from one end, thus allowing a facility cost reduction through size reduction and simplification of the processing device, enables formation of a protrusion close to an end of a pipe or on a pipe that has already been bent, and serves also as a device for clamping an end part of a pipe.

Solution to Problem

To achieve the object noted above, the present invention provides a pipe end processing device as set forth in the following (1) to (4).

(1) A pipe end processing device including: a female die having a molding surface for forming a protrusion; and a male die that presses a surface to be processed of a pipe against the molding surface of the female die, the female die having a through hole with one side thereof being radially increased, the through hole having the molding surface for forming the protrusion formed on an inner circumference on the one side of the through hole, and the male die including a metal core passed through the through hole of the female die and configured to be axially moved by a drive device provided on another side of the female die, and a tubular elastic body fitted on one end part of the metal core, the one end part protruding from the one side of the female die, the tubular elastic body being configured to be axially compressed by a movement of the metal core to radially expand by deformation thereby to press the surface to be processed of the pipe against the molding surface of the female die.

(2) The pipe end processing device set forth in (1) above, wherein the metal core is formed into tubular shape to allow a high-temperature fluid to flow into a pipe being processed via the tubular metal core.

(3) The pipe end processing device set forth in (1) above, wherein the tubular elastic body is made of any one of silicone rubber, ethylene rubber, butyl rubber, and chloroprene rubber.

(4) The pipe end processing device set forth in (1) above, further including a chuck that clamps an end part of the pipe in addition to the female die and the male die.

Advantageous Effects of Invention

The pipe end processing device according to the present invention described above allows a protrusion to be formed on a pipe by applying a force only from one end, thus allowing a facility cost reduction through size reduction and simplification of the processing device, enables formation of a protrusion close to an end of a pipe or on a pipe that has already been bent, and serves also as a device for clamping an end part of a pipe.

DESCRIPTION OF EMBODIMENTS

Figure 1:
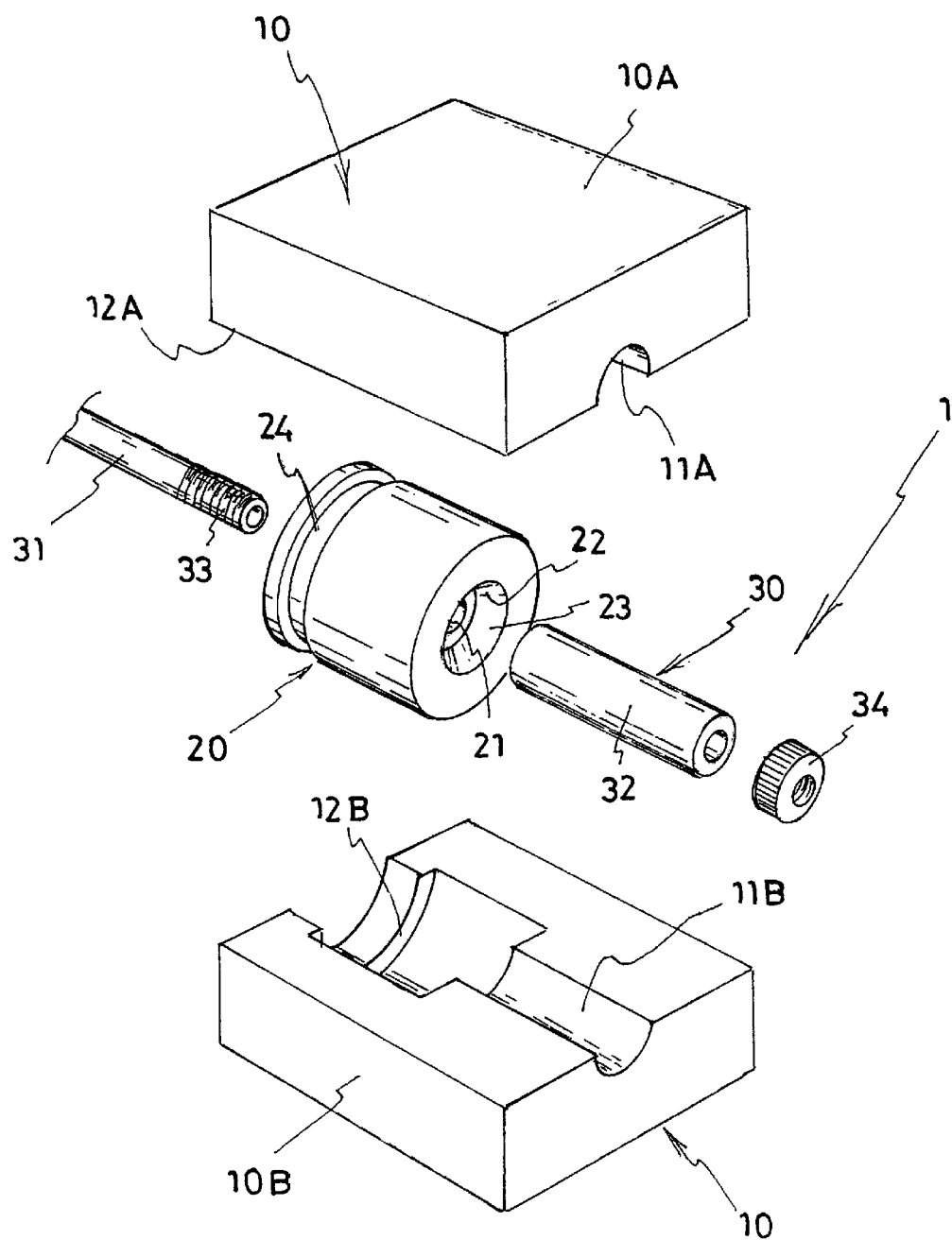
FIG. 1 is an exploded perspective view illustrating one embodiment of the pipe end processing device according to the present invention.
Figure 2:
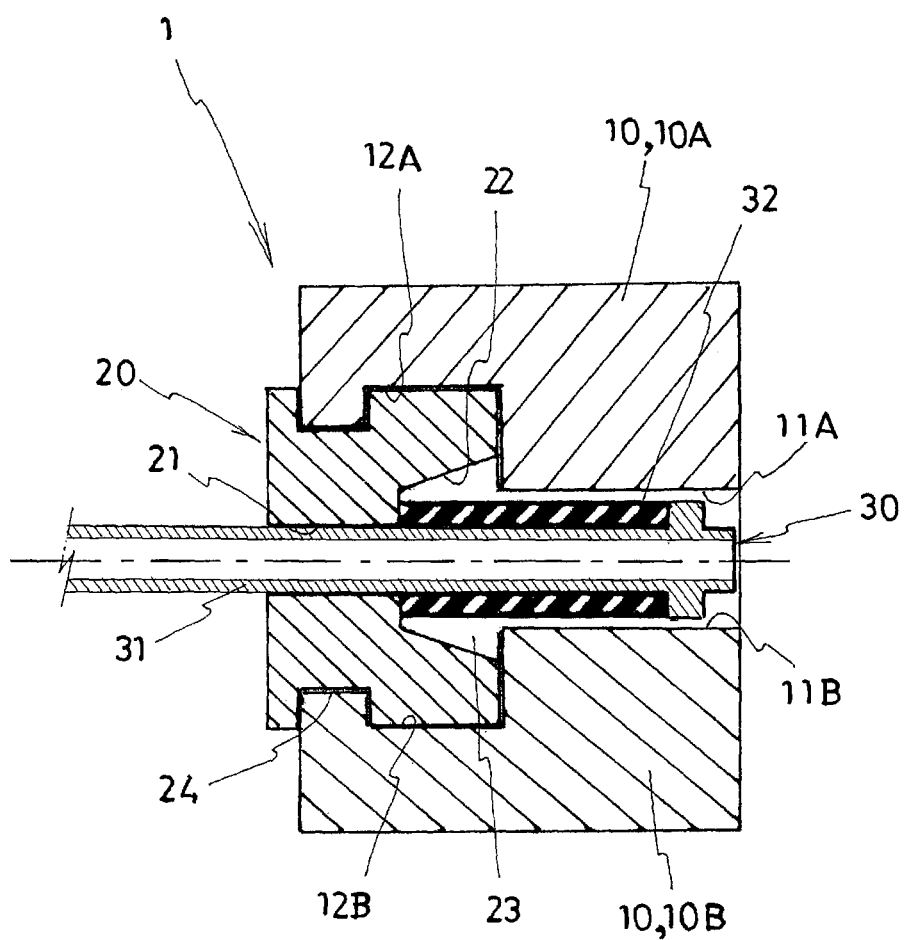
FIG. 2 is a longitudinal cross-sectional view of the pipe end processing device shown in FIG. 1.

Hereinafter, an embodiment of the pipe end processing device according to the present invention will be described in detail with reference to the drawings.

The drawings illustrate one embodiment of the pipe end processing device according to the present invention, wherein the illustrated pipe end processing device 1 includes a chuck 10, a female die 20, and a male die 30.

The chuck 10 is made up of a pair of combined chuck splits 10A and 10B so that it can be split into upper half and lower half. The chuck splits 10A and 10B are respectively formed with grooves 11A and 11B for holding a pipe P and female die receiving grooves 12A and 12B in which the female die 20 fits. The chuck splits 10A and 10B that form the chuck 10 are configured to move up and down respectively by a drive device (not shown) to clamp or release an end part of a pipe P.

The female die 20 is formed in a columnar shape, with a through hole 21 in the axial center. The through hole 21 has a radially increasing inner circumferential surface on one side where there is a molding surface 22 that imparts a form to a pipe P. In the illustrated embodiment, this molding surface 22 is a cavity 23 formed by an annular recess for forming an annular protrusion A called bulge to an end part of the pipe P. The female die 20 also has a position restricting groove 24 on an outer circumferential surface. The female die 20 should preferably be made of a material that has rigidity and good heat conductivity, for example a metal having heat-resistant and pressure-resistant characteristics such as aluminum, copper, SUS, brass, etc.

The male die 30 is made up of a metal core 31 inserted into the through hole 21 in the female die 20 described above, and a tubular elastic body 32 fitted on this metal core 31. In the illustrated embodiment, external threads 33 are formed at the distal end of the metal core 31, and with a nut 34 that doubles as a pressing plate for pressing the tubular elastic body 32 screwed on the external threads 33, the tubular elastic body 32 fitted on the metal core 31 is supported thereon.

The metal core 31 is configured to move along the axial direction by a drive device (not shown) provided on the other side of the female die 20 (left side in the drawing). The tubular elastic body 32 fitted on the metal core 31 is axially compressed by the movement of the metal core 31 to radially expand by deformation, thereby pressing a surface to be processed of the pipe P against the molding surface 22 of the female die 20 and causing a plastic deformation of the pipe P. The metal core 31 is formed into tubular shape so that it allows a fluid to pass through therein, and configured to allow a high-temperature fluid Z to be introduced into the attached pipe P via the tubular metal core 31.

The tubular elastic body 32 is formed as a tubular member having an outside diameter that is equal to or slightly smaller than the inside diameter of the pipe P to be processed, and an inside diameter that is equal to or slightly larger than the outside diameter of the metal core 31. The tubular elastic body 32 should preferably be formed of silicone rubber, ethylene rubber, butyl rubber, or chloroprene rubber, from the viewpoints of elasticity, and shock-resistant and heat-resistant characteristics. The tubular elastic body 32 need not necessarily be made of a single material and may have a double-layer structure using different materials for inner layer and outer layer.

The pipe end processing device 1 according to the present invention configured as described above is operated as follows wherein it processes an end part of the pipe P as well as clamps the end part.

Figure 3:
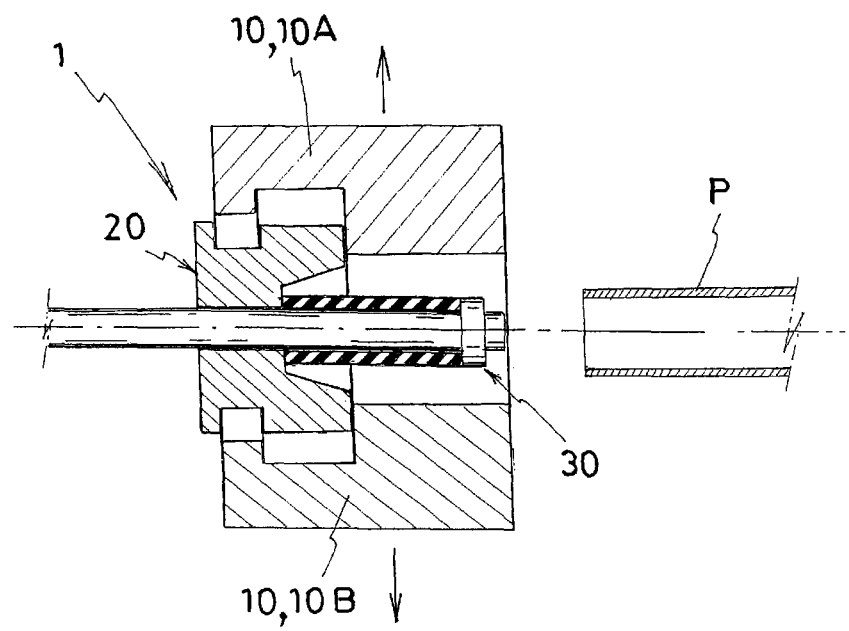
FIG. 3 is a cross-sectional view illustrating a step of operation of the pipe end processing device shown in FIG. 1, wherein the chuck is opened.
Figure 4:
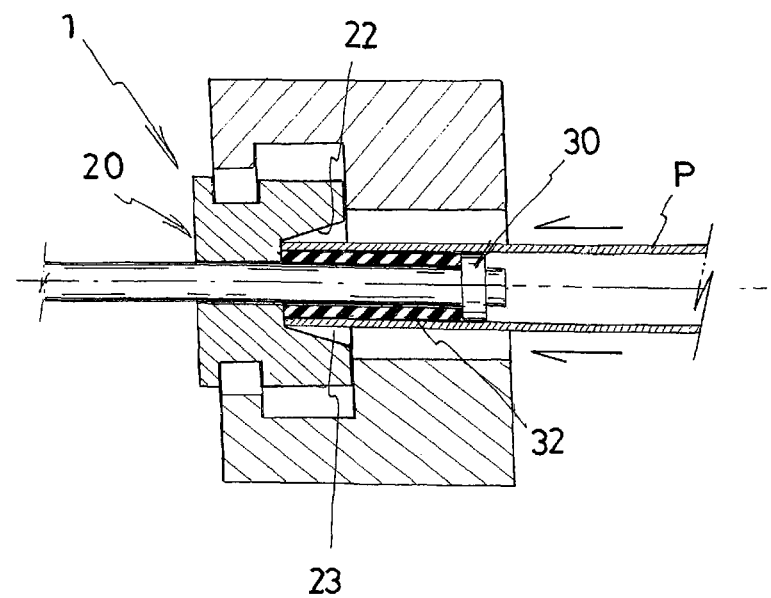
FIG. 4 is a cross-sectional view illustrating a step of operation of the pipe end processing device shown in FIG. 1, wherein a pipe is attached to the pipe end processing device.

First, as shown in FIG. 3, the chuck splits 10A and 10B that form the chuck 10 are moved up and down respectively by the drive device (not shown) to open the chuck 10 so that there is formed a space for inserting a pipe P. Then, the pipe P is moved by a robot hand or the like (not shown), and as shown in FIG. 4, an end part of the pipe P is attached to the tubular elastic body 32 of the male die 30 and inserted into the cavity 23 inside the molding surface 22 of the female die 20.

Figure 5:
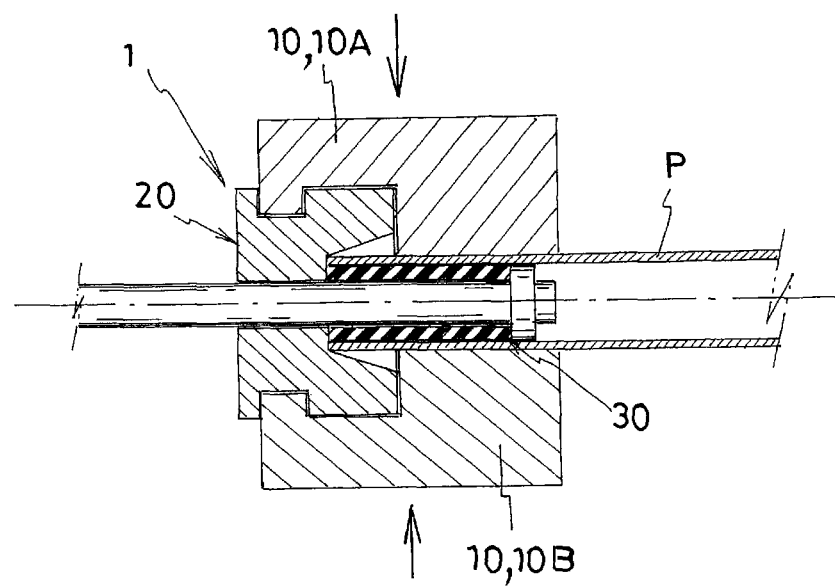
FIG. 5 is a cross-sectional view illustrating a step of operation of the pipe end processing device shown in FIG. 1, wherein the chuck is closed.
Figure 6:
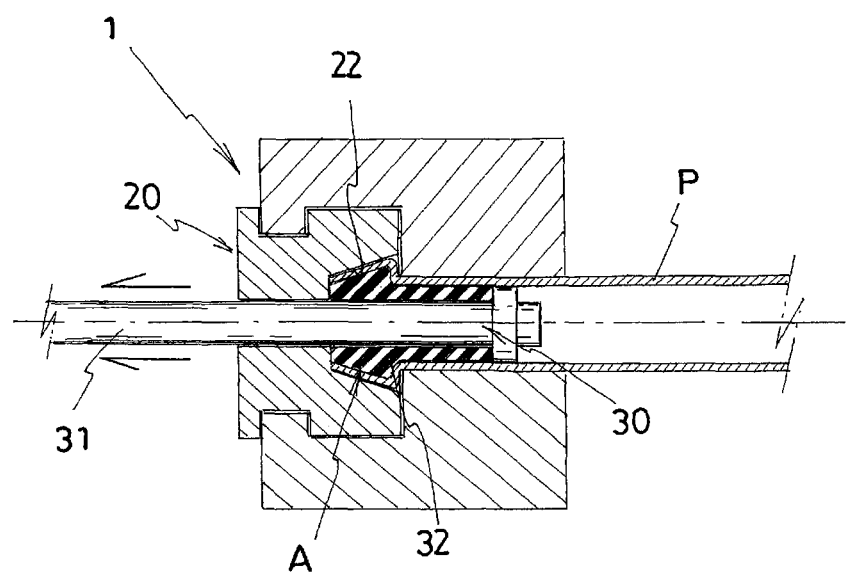
FIG. 6 is a cross-sectional view illustrating a step of operation of the pipe end processing device shown in FIG. 1, wherein the pipe is processed by the pipe end processing device.
Figure 10:
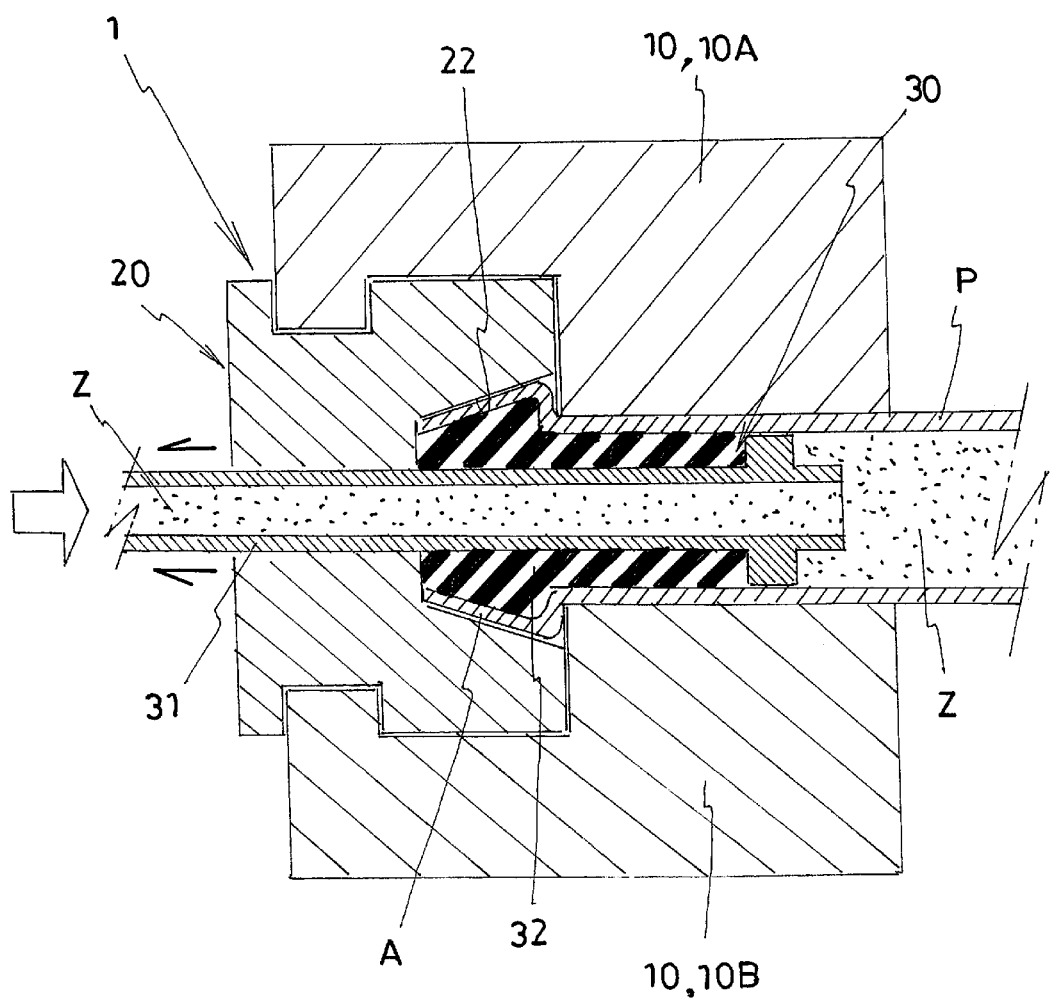
FIG. 10 is an enlarged cross-sectional view of essential parts of FIG. 6.

Next, as shown in FIG. 5, the chuck 10 is closed by the drive device (not shown) to clamp the end part of the pipe P with the chuck splits 10A and 10B. In this state, as shown in FIG. 6, the metal core 31 is pulled outward (leftward in the drawing) by the drive device (not shown) to axially compress the tubular elastic body 32 fitted on the metal core 31 so that the elastic body deforms to radially expand and presses the surface to be processed of the pipe P against the molding surface 22 of the female die 20, whereby an annular protrusion A called bulge is formed by the molding surface 22 on the end part of the pipe P. At this time, as shown in FIG. 10 to a larger scale, a high-temperature fluid (e.g., heated steam at a temperature of 110° C. to 170° C. and a pressure of 0.1 to 0.6 MPa) Z can be introduced into the pipe P via the tubular metal core 31. This causes thermal expansion of the tubular elastic body 32 so that the pressing force is increased, enabling more precise processing of the pipe P and enhancing the clamping force. Also, the heating of the entire pipe P allows certain processing such as bending to be performed to the pipe P.

Figure 7:
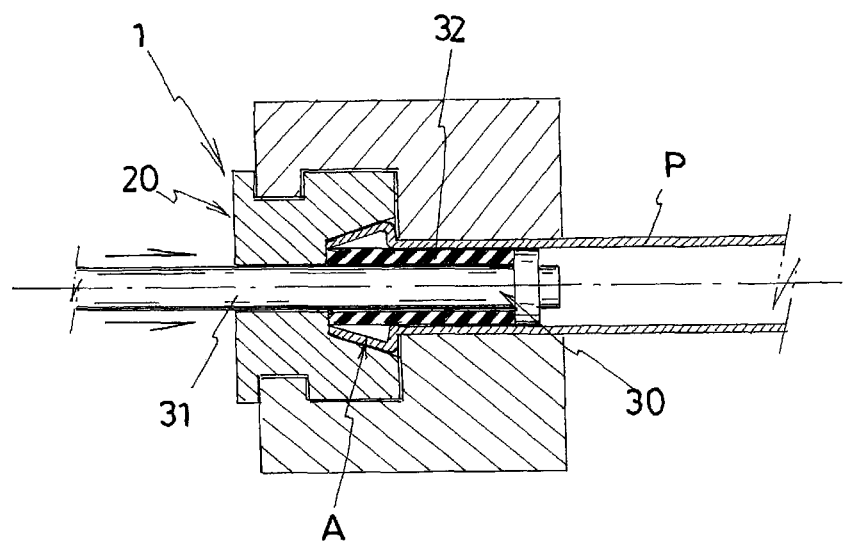
FIG. 7 is a cross-sectional view illustrating a step of operation of the pipe end processing device shown in FIG. 1, wherein a tubular elastic body is released from stress to stop its deformation.
Figure 8:
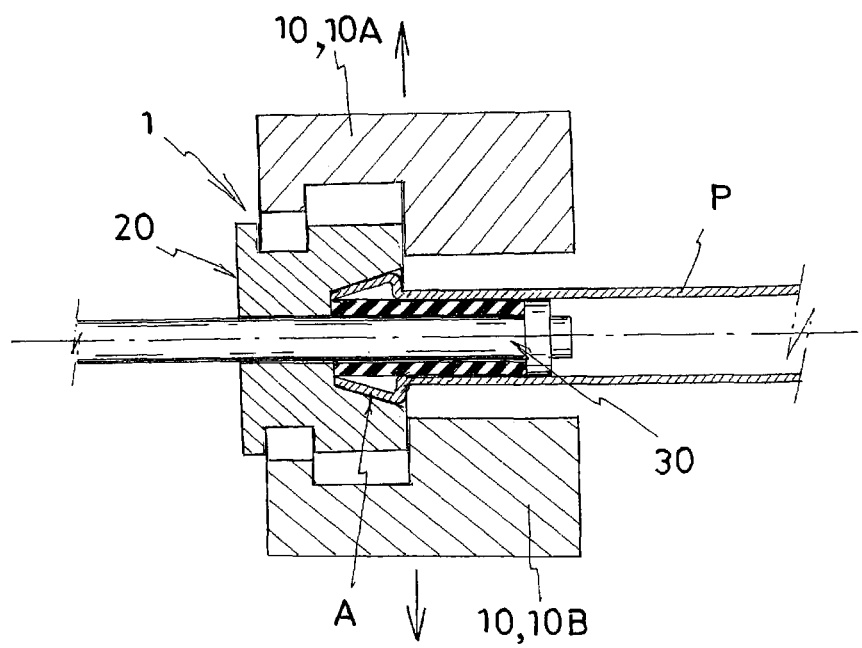
FIG. 8 is a cross-sectional view illustrating a step of operation of the pipe end processing device shown in FIG. 1, wherein the chuck is opened.
Figure 9:
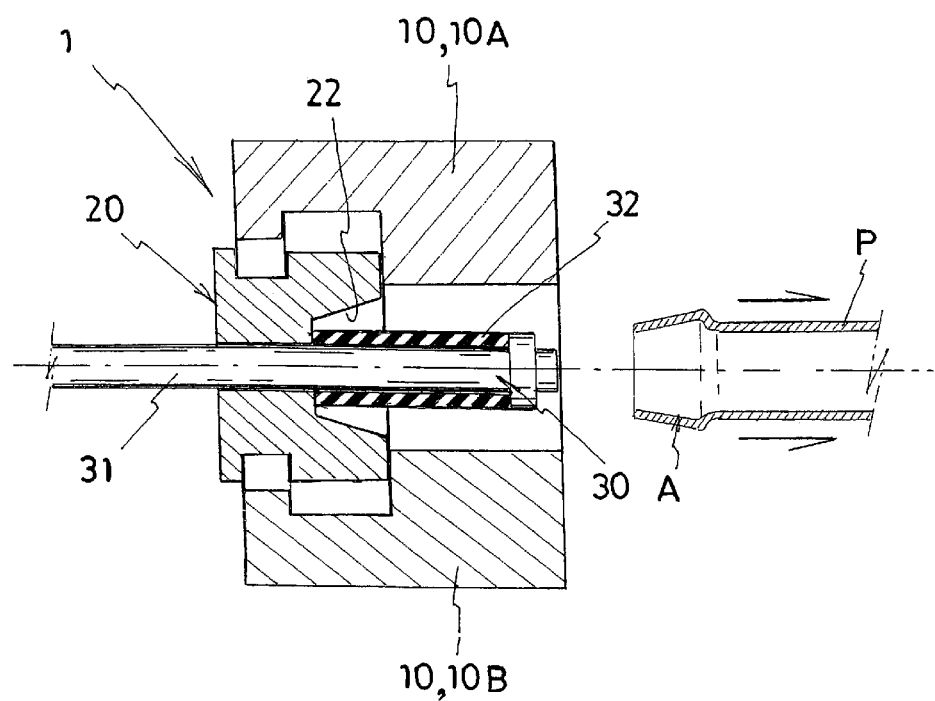
FIG. 9 is a cross-sectional view illustrating a step of operation of the pipe end processing device shown in FIG. 1, wherein the pipe is pulled out of the pipe end processing device.

When the intended processing operation to the pipe P is finished, the grip by the pipe end processing device 1 according to the present invention is loosened and the pipe P is pulled out. To release the pipe P from the hold, first, the pulling of the metal core 31 by the drive device (not shown) is stopped so that the tubular elastic body 32 that has deformed and expanded returns to its original state by its elasticity, as shown in FIG. 7. The supply of a high-temperature fluid Z, if any, into the pipe P through the metal core 31 is stopped. Next, the chuck 10 is opened by the drive device (not shown) to release the pipe P from the grip by the chuck splits 10A and 10B as shown in FIG. 8. Next, the pipe P is pulled out of the pipe end processing device 1 by the robot hand or the like (not shown) as shown in FIG. 9.

The annular protrusion A called bulge formed to the end part of the pipe P as described above is formed by the molding surface 22 of the female die 20 that has a uniform surface without joints, so that a very smooth annular protrusion A without irregularities such as burrs can be formed, and the protrusion A, which does not require any secondary processing such as polishing, when applied to connection with a rubber hose or the like, can ensure and maintain an airtight seal in the connected parts, as well as serves to prevent unwanted disconnection of the hose or the like from the pipe P by increasing the friction resistance.

The pipe end processing device 1 according to the present invention described above allows the protrusion A to be formed on the pipe P by applying a force only from one end, i.e., allows a facility cost reduction through size reduction and simplification of the processing device. Moreover, it enables formation of a protrusion A close to an end of a pipe P or on a pipe P that has already been bent, and since it serves also as a device for clamping an end part of a pipe P, the device can be used also as a chuck device when bending or otherwise processing the pipe P.

While one embodiment of the chuck device according to the present invention has been described, it goes without saying that the technical scope of the present invention is not limited to the embodiment described above. It will be obvious to a person skilled in the art that various modifications and improvements can be made to the embodiment described above, and as will be clear from the wordings of the claims, the forms with these modifications and improvements can also be included in the technical scope of the present invention.

INDUSTRIAL APPLICABILITY

The pipe end processing device according to the present invention described above allows a facility cost reduction through size reduction and simplification, enables formation of a protrusion close to an end of a pipe or on a pipe that has already been bent, and also serves as a device for clamping an end part of a pipe, so that it can be suitably used as a device for processing an end part of a steel or synthetic resin pipe used in various types of tubing such as automotive tubing, or as a chuck device for clamping the end part when bending or otherwise processing the pipe.

REFERENCE SIGNS LIST

1 Pipe end processing device
10 Chuck
10A, 10B Chuck split
11A, 11B Groove for holding pipe
12A, 12B Female die receiving groove
20 Female die
21 Through hole
22 Molding surface
23 Cavity
30 Male die
31 Metal core
32 Tubular elastic body
33 External threads
34 Nut (pressing plate)
P Pipe
A Annular protrusion (bulge)
Z High-temperature fluid (heated steam)

The invention claimed is:

1. A pipe end processing device comprising:
a female die having a molding surface configured to form a protrusion; and
a male die configured to press a surface to be molded against the molding surface of the female die,
the female die having a through hole extending along an axial center of the female die, a radially increasing inner circumferential surface of the through hole on one side of the female die forming the molding surface configured to form a protrusion;
the male die including a metal core passed through the through hole of the female die and configured to be axially moved by a drive device provided on another side of the female die opposite the one side of the female die, the metal core having one end part protruding from the one side of the female die, and
a tubular elastic body fitted on the one end part of the metal core, the metal core and the tubular elastic body being configured to axially compress the tubular elastic body by a movement of the metal core to radially expand the tubular elastic body by deformation thereby causing the tubular elastic body to press an inner surface of a pipe to be processed toward the molding surface of the female die and to press an outer surface of the pipe to be processed against the molding surface of the female die.

2. The pipe end processing device according to claim 1, wherein the metal core of the male die is a hollow metal core configured to allow a high-temperature fluid to flow into a pipe being processed via the hollow metal core.

3. The pipe end processing device according to claim 1, wherein the tubular elastic body is made of any one of silicone rubber, ethylene rubber, butyl rubber, and chloroprene rubber.

4. The pipe end processing device according to claim 1, further comprising a chuck that clamps an end part of the pipe in addition to the female die and the male die.

5. The pipe end processing device according to claim 1, wherein the surface of the pipe to be processed is adjacent an end of the pipe.

6. The pipe end processing device according to claim 1, wherein the pipe to be processed is a member selected from the group consisting of metal pipes and synthetic resin pipes.

7. The pipe end processing device according to claim 1, wherein the one end part of the metal core includes a pressing plate configured to press the tubular elastic body.

8. The pipe end processing device according to claim 1, wherein the tubular elastic body is made of an elastic material selected from the group consisting of silicone rubber, ethylene rubber, butyl rubber, chloroprene rubber and mixtures thereof.

9. A pipe end processing device comprising:
a female die having a cavity with a molding surface configured to form a protrusion;
a male die configured to press a surface to be molded against the molding surface of the female die,
the female die having a through hole extending along an axial center of the female die, an inner circumferential wall of the through hole on one side of the female die forming the cavity with the molding surface configured to form a protrusion;
the male die including a metal core extending through the through hole of the female die and configured to move axially within the through hole by a drive device provided on another side of the female die opposite the one side of the female die, the metal core having one end part extending beyond the one side of the female die; and
the male die including a tubular elastic body coaxially fitted on the metal core between the one end part of the metal core and the female die, the male die being configured to receive and hold a pipe to be processed coaxially on the tubular elastic body with an end of the pipe to be processed abutting the female die, wherein the pipe end processing device is configured, by movement of the one end part of the metal core toward the molding surface of the female die, to axially compress, deform and radially expand the tubular elastic body, whereby the radially expanded tubular elastic body fills the cavity of the female mold, presses an inner surface of a pipe to be processed toward the molding surface of the female die and presses an outer surface of the pipe to be processed against the molding surface of the female die.

10. The pipe end processing device according to claim 9, wherein the metal core of the male die is a hollow metal core configured to allow a high-temperature fluid to flow into a pipe being processed via the hollow metal core.

11. The pipe end processing device according to claim 9, wherein the tubular elastic body is made of an elastic material selected from the group consisting of silicone rubber, ethylene rubber, butyl rubber, chloroprene rubber and mixtures thereof.

12. The pipe end processing device according to claim 9, further comprising a chuck that clamps an end part of the pipe in addition to the female die and the male die.

13. The pipe end processing device according to claim 9, wherein the surface of the pipe to be processed is adjacent an end of the pipe.

14. The pipe end processing device according to claim 9, wherein the pipe to be processed is a member selected from the group consisting of metal pipes and synthetic resin pipes.

15. The pipe end processing device according to claim 9, wherein the one end part of the metal core includes a pressing plate configured to press the tubular elastic body.

16. The pipe end processing device according to claim 9, wherein the tubular elastic body is made of an elastic material selected from the group consisting of silicone rubber, ethylene rubber, butyl rubber, chloroprene rubber and mixtures thereof.

* * * * *